US011331999B2

(12) United States Patent
Obergasser et al.

(10) Patent No.: US 11,331,999 B2
(45) Date of Patent: May 17, 2022

(54) TRIPLE CLUTCH ASSEMBLY, POWERTRAIN, AND MOTOR VEHICLE

(71) Applicant: ZF FRIEDRICHSHAFEN AG, Friedrichshafen (DE)

(72) Inventors: Michael Obergasser, Friedrichshafen (DE); Matthias Wesa, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 293 days.

(21) Appl. No.: 16/335,201

(22) PCT Filed: Aug. 11, 2017

(86) PCT No.: PCT/EP2017/070449
§ 371 (c)(1),
(2) Date: Mar. 20, 2019

(87) PCT Pub. No.: WO2018/054605
PCT Pub. Date: Mar. 29, 2018

(65) Prior Publication Data
US 2019/0344656 A1    Nov. 14, 2019

(30) Foreign Application Priority Data

Sep. 22, 2016  (DE) ..................... 10 2016 218 264.1

(51) Int. Cl.
*B60K 6/48*  (2007.10)
*B60K 6/387* (2007.10)
(Continued)

(52) U.S. Cl.
CPC ............... *B60K 6/387* (2013.01); *B60K 6/40* (2013.01); *B60K 6/48* (2013.01); *B60K 17/02* (2013.01);
(Continued)

(58) Field of Classification Search
CPC .. B60K 6/387; B60K 6/40; B60K 6/48; F16H 3/006
See application file for complete search history.

(56) References Cited

U.S. PATENT DOCUMENTS 8,453,817 B2 * 6/2013 Schrage ................. B60K 6/405
192/48.611
8,695,743 B2 * 4/2014 Kraxner ................ B60W 10/02
180/165

(Continued)

FOREIGN PATENT DOCUMENTS

DE  102007003107 A1 *  8/2007 ......... F16D 25/0638
DE  10 2009 059944       7/2010
(Continued)

*Primary Examiner* — Sherry L Estremsky
(74) *Attorney, Agent, or Firm* — Cozen O'Connor

(57) ABSTRACT

A triple clutch arrangement and a powertrain for a motor vehicle with a dual clutch transmission for use between at least two drive devices and the dual clutch transmission. A first clutch and a second clutch of the triple clutch arrangement are connectable to the first drive device and in each instance to a transmission input shaft. The first drive device and the second drive device are both connected to, or connectable to, a primary side of the first clutch and/or the second clutch via the third clutch.

17 Claims, 12 Drawing Sheets

(51) Int. Cl.
    *B60K 6/40*        (2007.10)
    *B60K 17/02*     (2006.01)
    *F16H 3/00*      (2006.01)

(52) U.S. Cl.
    CPC ...... *F16H 3/006* (2013.01); *B60Y 2400/4244* (2013.01)

(56) References Cited

U.S. PATENT DOCUMENTS

| | | | | |
|---|---|---|---|---|
| 9,193,255 | B2 * | 11/2015 | Arnold | B60K 6/48 |
| 10,843,557 | B2 * | 11/2020 | Reimnitz | F16D 25/0638 |
| 10,851,847 | B2 * | 12/2020 | Lorenz | F16D 25/10 |
| 2011/0240384 | A1 | 10/2011 | Roske et al. | |
| 2015/0210266 | A1 * | 7/2015 | Yang | B60K 6/52 |
| | | | | 701/22 |

FOREIGN PATENT DOCUMENTS

| | | | | |
|---|---|---|---|---|
| DE | 10 2009 016673 | | 10/2010 | |
| DE | 10 2011 117 781 | | 5/2013 | |
| DE | 10 2012 024 699 | | 7/2013 | |
| DE | 102017109425 | A1 * | 11/2018 | B60K 6/387 |

\* cited by examiner

TRIPLE CLUTCH ASSEMBLY, POWERTRAIN, AND MOTOR VEHICLE

CROSS REFERENCE TO RELATED APPLICATIONS

This is a U.S. national stage of application No. PCT/EP2017/070449, filed on Aug. 11, 2017. Priority is claimed on German Application No. DE102016218264.1, filed Sep. 22, 2016, the content of which is incorporated herein by reference.

BACKGROUND OF THE INVENTION

1. Field of the Invention

The invention is directed to a triple clutch arrangement for a motor vehicle with dual clutch transmission for use between at least two drive devices and the dual clutch transmission, wherein the first clutch and the second clutch of the triple clutch arrangement are connectable to the first drive device and in each instance to a transmission input shaft.

2. Description of Prior Art

Electrification of a powertrain is a megatrend in the automobile industry. In this connection, both manual transmissions and automatic transmissions are hybridized by providing an electric motor as drive device in addition to the internal combustion engine.

Apart from this, however, it is also conceivable to configure the second drive device as a motor powered by hydrogen or the like.

In known motor vehicles with dual clutch transmissions, a disconnect clutch is also provided for the second drive device in addition to the clutches of the dual clutch. In this regard, it is known to arrange the clutch of the second drive device between the motor and the dual clutch, the electric motor being arranged as a coaxial motor, i.e., coaxial to the transmission input shafts.

SUMMARY OF THE INVENTION

In view of the foregoing, it is an object of one aspect of the present invention to provide a clutch arrangement which makes it possible to make better use of the installation space.

In order to solve this problem, it is suggested for a triple clutch arrangement of the type mentioned above that the first drive device and the second drive device both be connected to, or connectable to, the primary side of the first clutch and/or the second clutch via the third clutch.

It is seen as the core of the invention to configure the triple clutch arrangement in such a way that both drive units are connectable to the primary side of the first clutch and/or second clutch via the third clutch so as to make optimal use of installation space. Due to the fact that all of the clutches of the powertrain are arranged spatially close to one another, further installation spaces can be optimized through dual utilization of component parts and by economizing on axial and/or radial installation space. Additionally, dead spaces, which are present in every clutch, can be minimized.

On the other hand, in known configurations of triple clutch arrangements the electric motor is usually arranged coaxially as was described; hence the attempt to optimize the arrangement of the electric motor and the disconnect clutch associated with it.

The clutches of the triple clutch arrangement are advantageously formed as multiplate clutches. Further preferably, the clutches can be formed as wet clutches. Alternatively, at least the third clutch can be formed as a dog clutch shift element. As a further alternative, the clutches can be at least partially dry type clutches.

Depending upon the intended use, the clutches can be formed as pull type clutches or push type clutches. While pull clutches are used chiefly in the domain of utility vehicles, push clutches are mostly used in the domain of passenger cars.

Further, the clutches can be formed as normally-open (n-o) clutches or as normally-closed (n-c) clutches. Preferably, at least one of the two clutches of the dual clutch arrangements is formed as an n-o clutch. For safety reasons, at least one of the two clutches of the dual clutch arrangements must be open in case of error. Preferably, both clutches are opened in case of error. Opening one clutch of the dual clutch arrangement prevents an entanglement of the transmission, which would lead to destruction of the transmission. An unwanted continued driving of the motor vehicle is ruled out by opening both clutches. Therefore, it is usual to construct both clutches of the dual clutch arrangement as n-o clutches. On the other hand, it is also advantageous in terms of energy when one of the two clutches is formed as an n-c clutch and the other is formed as an n-o clutch. In this case, a safety precaution must be taken to keep the n-c clutch open in case of error.

The third clutch, which connects the first drive device and second drive device to the dual clutch transmission, can be configured electively as an n-o clutch or an n-c clutch. The configuration depends on energy considerations and the intended mode of operation of the electric motor or second drive device as well as safety considerations.

The third clutch can preferably be connectable to the second drive device on the secondary side. Clutches always have an input side and an output side, also known as primary side and secondary side or drive side and driven side. In multiplate clutches, the outer plate carrier with the outer plates is associated with the primary side, and the inner plate carrier with the inner plates is associated with the secondary side. However, the exact opposite may also be the case. Likewise, the outer plate carrier and the outer plates belong to one side and the inner plate carrier and inner plates belong to the other side.

Preferably, the third clutch can also be fixedly connected to at least one of the other clutches of the triple clutch arrangement on the secondary side. The third clutch is then an intermediate member that transmits torque from the first drive device to one or both of the other clutches. In this case, it is preferably provided that the third clutch is fixedly connected to the two other clutches of the triple clutch arrangement, i.e., can transfer torque to both clutches. This makes it possible for the drive units to deliver torque to both partial transmissions of the dual clutch arrangement.

The primary side of the third clutch can preferably be connected, or is connectable, to the first drive unit. The third clutch can then disconnect the first drive unit, preferably an internal combustion engine, from the rest of the powertrain.

The secondary side of the third clutch can preferably be fixedly connected to at least one primary side, particularly both primary sides, of the two other clutches of the triple clutch arrangement. In this case, both the first drive device and the second drive device can give torque directly to the primary side of the clutches of the dual clutch. As has been described, the advantage of this arrangement is that the torque of the internal combustion engine and of the electric motor is always transferred to both partial transmissions. Even in the overlapping phase when the clutches of the dual clutch transmission are both operated in slip, the torque of the motors arrives at the output shaft or output shafts on both sub-paths.

The clutches can advantageously be arranged in a substantially L-shaped manner. The L-shape is in cross section and refers to the arrangement of the plate packs. One plate pack is arranged coaxially and axially overlapping a second plate pack, and the third plate pack is arranged following the first plate pack or second plate pack in axial direction. In this arrangement, an output shaft of the second drive device can engage in the triple clutch arrangement so as to achieve a particularly compact constructional form.

Alternatively, the clutches can be arranged substantially coaxially. The electric motor can then engage in a particularly simple manner radially outwardly at the triple clutch arrangement, and the intervening space between the transmission input shafts and the electric motor can be occupied, for example, by actuation devices of the clutches.

The third clutch can advantageously lie closer to the transmission than at least one of the two other clutches. Alternatively, it may sometimes be sufficient when the connection point between the second drive device and the third clutch is arranged closer to the transmission than at least one of the two other clutches of the triple clutch arrangement. Surprisingly, it has been shown that installation space is minimized on the whole in an arrangement of this type, although the dual clutches are arranged farther away from the transmission than is absolutely necessary. That is, as a result of this arrangement, the expenditure for connecting K0 and the second drive device is reduced to a greater extent than the expenditure for the connection between the clutches of the dual clutch arrangement and the transmission is increased.

This arrangement of the disconnect clutch between second drive device and dual clutch transmission is made possible for the first time through a change in viewpoint. In this viewpoint, namely, the triple clutch arrangement is preferably an assembly unit in which at least the plate packs of the clutches are preassembled such that they can be arranged together at the transmission. It is not important whether a housing cover is connected prior to this assembly step or after this assembly step or whether the hydraulic oil is added before this assembly step or after this assembly step. In a particularly preferred manner, the triple clutch arrangement is a completely preassembled assembly unit with coolant oil and/or pressure oil already added for actuating the clutch arrangement.

This construction also increases modularity. The second drive device can then simply be omitted and the assembly unit can comprise a dual clutch arrangement. Then, instead of a hybrid vehicle, a vehicle with a conventional powertrain is obtained, and vice versa, by exchanging a few modules. However, the wheel set and substantial parts of the hydraulic system in particular can remain unchanged.

As actuation devices, either diaphragm springs and/or release bearings with ball ramp and/or devices actuated by piston and/or pressure oil can be provided. The actuation devices of the clutches of the triple clutch arrangement can be electrical, electrohydraulic or hydraulic.

The triple clutch arrangement can advantageously be supported at both sides by at least one bearing. This makes possible an independent actuation of the disconnect clutch between electric motor and transmission and the clutches of the dual clutch and an excellent support in the housing.

The third clutch can preferably be formed as a multiplate clutch, and the outer plate carrier of the third clutch can be arranged on the secondary side. The outer plates are then also located on the secondary side as has already been described.

The inner plate carrier of the third clutch can advantageously be formed as part of the housing of at least one of the other clutches. Accordingly, depending on the arrangement of the three clutches of the triple clutch arrangement, the inner plate carrier of the third clutch surrounds one or both clutches of the dual clutch arrangements. In this way, the inner plate carrier of the third clutch can perform a double function so as to economize on further installation space and material.

The triple clutch arrangement can preferably have at the outer side a connection point, particularly a toothing, via which the third clutch is connected to or connectable to the second drive device. That is, the second drive device can advantageously be connected to the triple clutch arrangement so as to be fixed with respect to rotation relative to it.

In particular, the connection point can be arranged at the secondary side, particularly at the outer plate carrier, of the third clutch device. The second drive device is then connected directly and without coupling possibility to the dual clutch or the first and/or second clutch. However, if the second drive device is constructed as an electric motor, it can run at idle if there is no torque to be delivered. In particular, an electric motor or other motor can be connected to the triple clutch arrangement in a paraxial construction.

The first clutch and the second clutch can advantageously be formed as dual clutch. That is, a known dual clutch module can essentially continue to be used. The housing may have to be adapted.

The invention is further directed to a powertrain for a motor vehicle having a first drive device, a second drive device, a triple clutch arrangement and a transmission. The powertrain is formed in that the triple clutch device is constructed in the manner described above.

The second drive device can advantageously be formed as paraxial electric motor. An overall optimal use of installation space can be carried out with this configuration as has been described.

The first drive device is advantageously configured as internal combustion engine. This results in a hybrid powertrain comprising internal combustion engine and electric motor.

The first transmission input shaft and second transmission input shaft of the dual clutch transmission are advantageously arranged coaxially. The configuration of the transmission is optional in principle; a multitude of possible configurations with one or two countershafts are known.

In addition, the invention is directed to a motor vehicle with a powertrain and/or with a triple clutch arrangement. The motor vehicle is characterized in that the powertrain and/or the triple clutch arrangement are/is constructed in the manner described above.

BRIEF DESCRIPTION OF THE DRAWINGS

Further advantages, features and particulars of the invention will be apparent from the following description of embodiment examples and figures. The drawings show.

DETAILED DESCRIPTION OF THE PRESENTLY PREFERRED EMBODIMENTS

Figure 1:
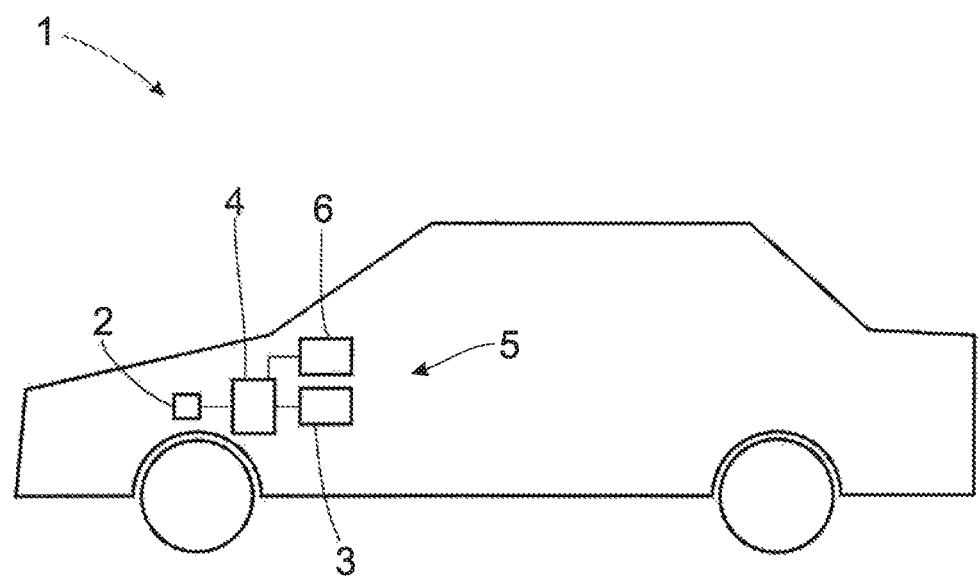
FIG. 1 is a motor vehicle.

FIG. 1 schematically shows a motor vehicle 1 with a first drive device 2, a dual clutch transmission 3 and a clutch device 4 arranged between first drive device 2 and dual clutch transmission 3. Further, powertrain 5 of motor vehicle 1 has a second drive device 6 which can likewise transfer torque to the transmission 3 via clutch arrangement 4. Second drive device 6 is arranged paraxial to the transmission input shafts of dual clutch transmission 3.

This construction of the powertrain is preferably provided for a front transverse drivetrain. Thus in a real installed position, the portion of the powertrain depicted is rotated by 90° in relation to the longitudinal axis of the vehicle. In order to make possible a mode of construction which is optimized for installation space, clutch arrangement 4 is configured as shown in the following figures.

Figure 2:
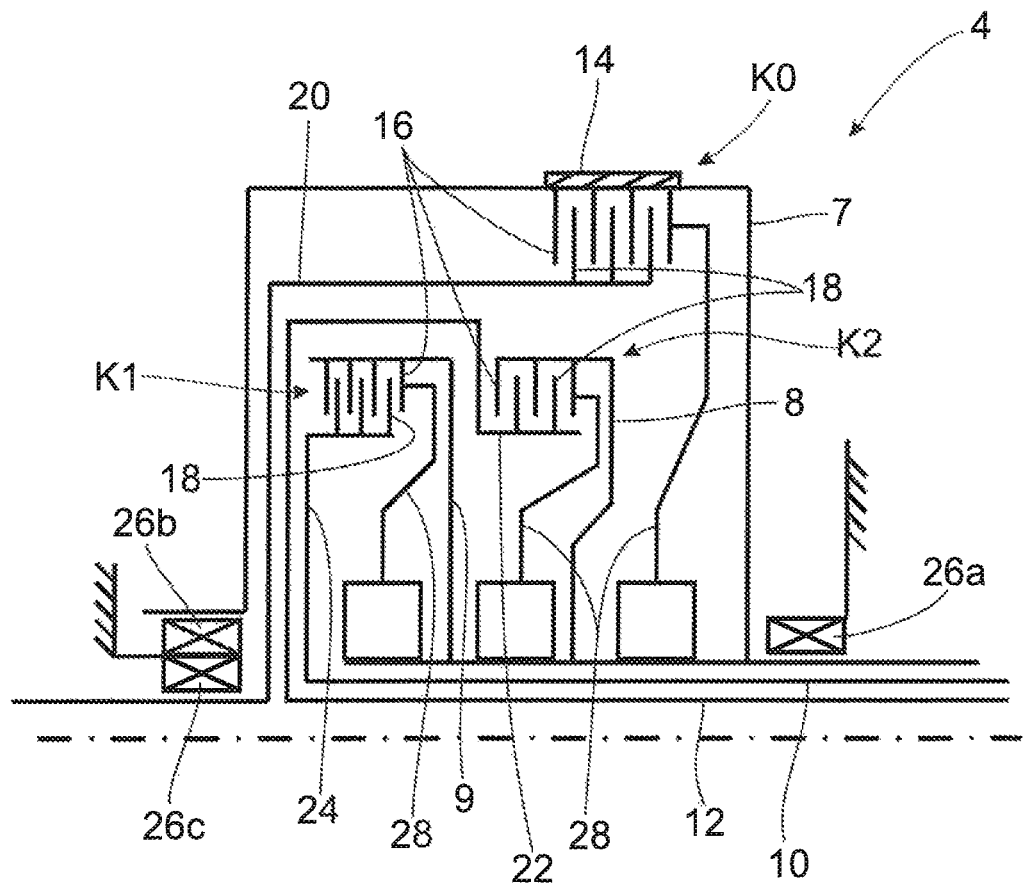
FIG. 2 is a triple clutch arrangement configuration.

FIG. 2 shows a first configuration of clutch arrangement 4. This clutch arrangement 4 has three clutches K0, K1 and K2 and is accordingly a triple clutch arrangement. In this arrangement, the secondary side of clutch K0 is fixedly connected to the primary sides of clutches K1 and K2. The inner plate carrier 20 of clutch K0, the outer plate carrier 8 of clutch K2 and the outer plate carrier 9 of clutch K1 are arranged on the primary sides. The primary side of clutch K0, that is, the inner plate carrier 20, is preferably connected to the first drive unit.

In FIG. 2 as in the following figures, the clutch for connecting first drive device 2 and second drive device 6 is designated by K0 and the clutches associated with the transmission input shafts 10 and 12 are designated by K1 and K2, respectively. The clutch of the dual clutch arrangement that is connected to the outer transmission input shaft 10 is preferably designated by K1 and the clutch connected to the inner transmission input shaft 12 is designated by K2. However, this is not compulsory; clutches K1 and K2 are connected to one of the transmission input shafts in every case.

Outer transmission input shaft 10 is preferably formed as a hollow shaft.

A toothing 14 via which second drive device 6 is connectable to clutches K1 and K2 is located on the secondary side of clutch K0. The connection can take place directly in that the output shaft of second drive device 6 meshes with toothing 14. However, a toothed wheel or a plurality of toothed wheels can also be arranged between toothing 14 and the driveshaft of second drive device 6 to allow space between the output shaft of second drive device 6 and toothing 14. In the configuration shown in FIG. 2, toothing 14 is provided at outer plate carrier 7.

Clutches K0, K1 and K2 each have outer plates 16 and inner plates 18, which are connected, respectively, to outer plate carrier 7, 8 or 9 and to inner plate carrier 20, 22 or 24, respectively, so as to be fixed with respect to rotation relative to the latter. The entirety of inner plates 18 and/or outer plates 16 of a clutch is also referred to as a plate pack.

Bearings 26a, 26b, and 26c are located on both sides of clutch arrangement 4 to support clutch arrangement 4.

Pistons are shown as actuation devices 28; however, the clutches can be actuated in any way in principle.

Figure 3:
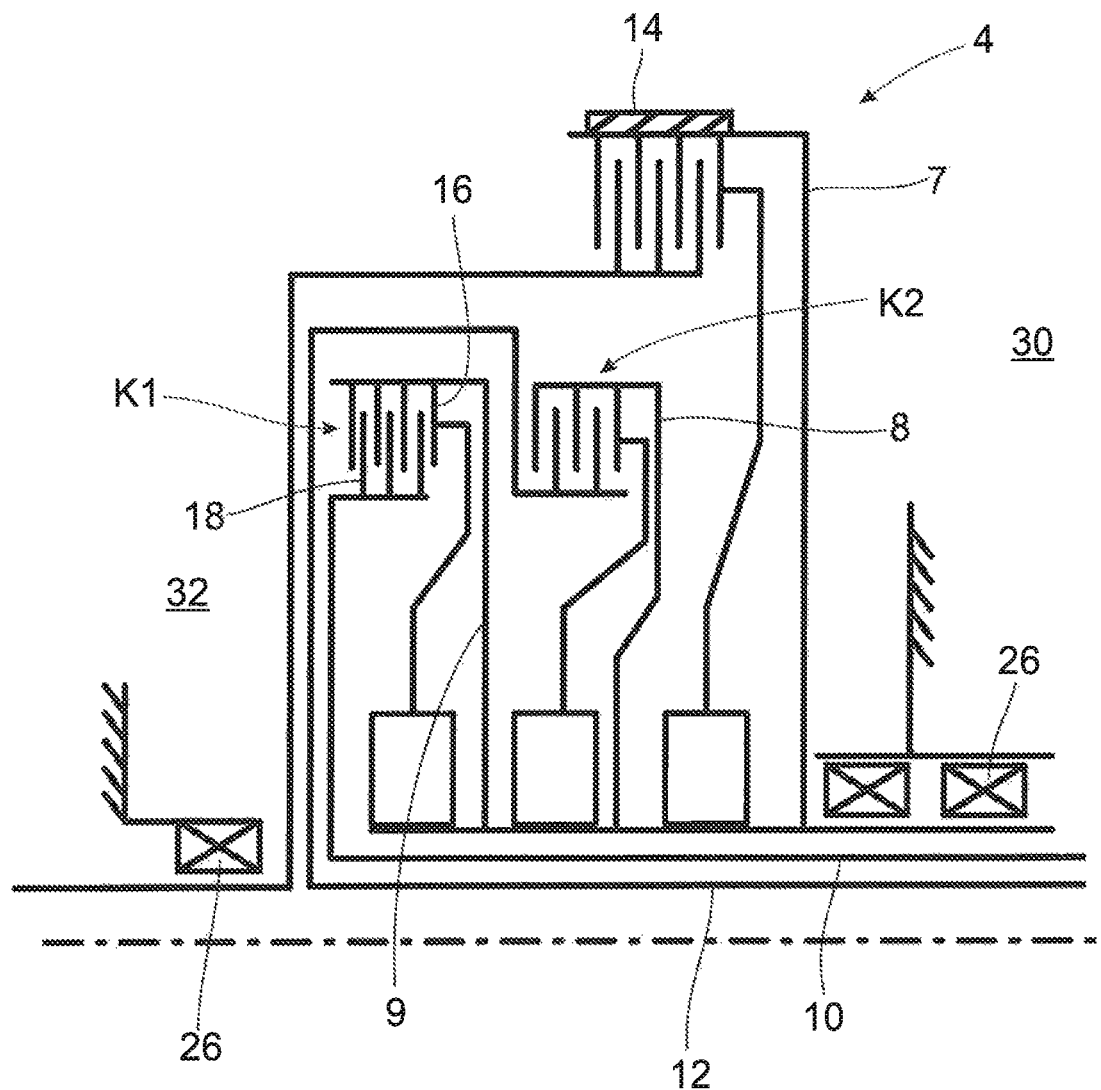
FIG. 3 is a triple clutch arrangement configuration.

FIG. 3 shows an alternative configuration of clutch arrangements 4, wherein only the bearing support of clutch K0 has been modified over FIG. 2. Two bearings 26 are provided on the transmission side 30 and not one bearing on the motor side 32, and vice versa, as in FIG. 2. FIGS. 2 and 3 are identical in other respects and, therefore, FIG. 2 is referred to with regard to the further description of clutch arrangement 4 according to FIG. 3.

Figure 4:
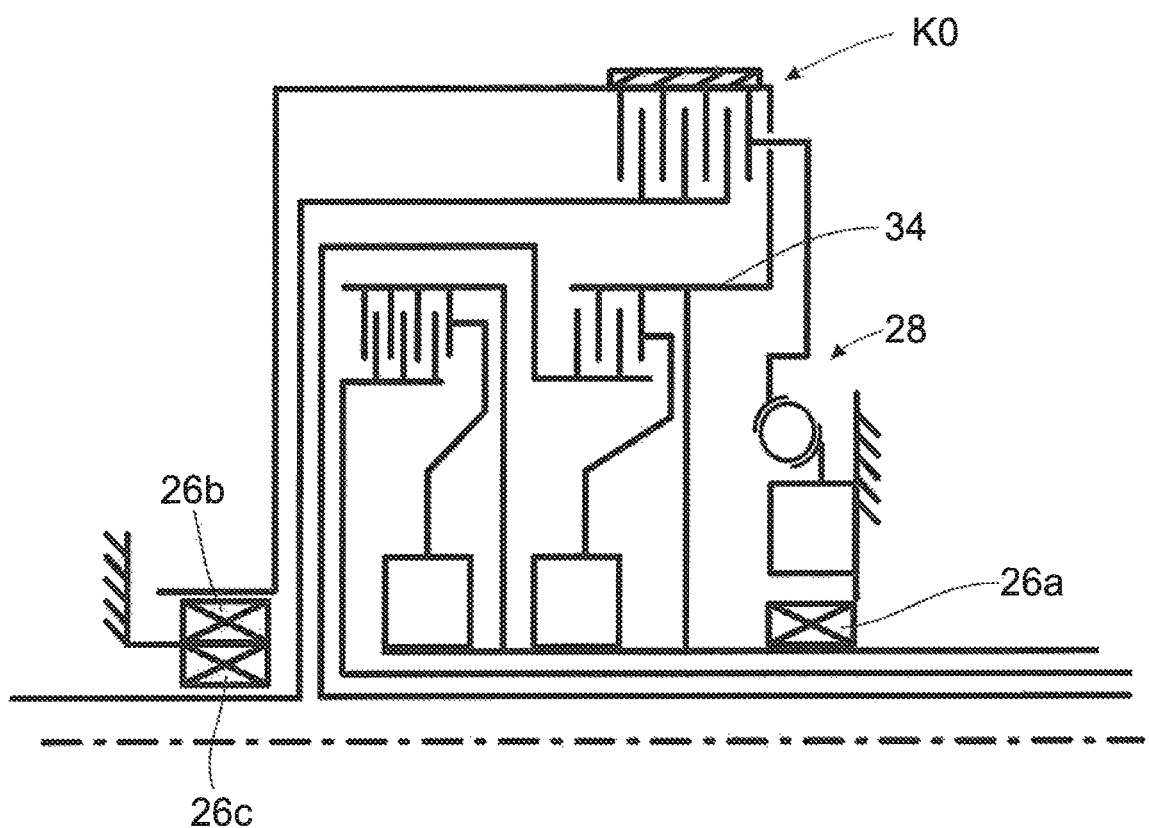
FIG. 4 is a triple clutch arrangement configuration.

FIG. 4 shows a further modification of the configuration according to FIG. 2. In FIG. 4, bearing 26a is arranged in such a way that it supports actuation device 28 of clutch K0. However, basically independent from the bearing support of actuation device 28, outer plate carrier 7 and outer plate carrier 8 are joined to form a double outer plate carrier 34. Axial installation space can be saved in this way.

Figure 5:
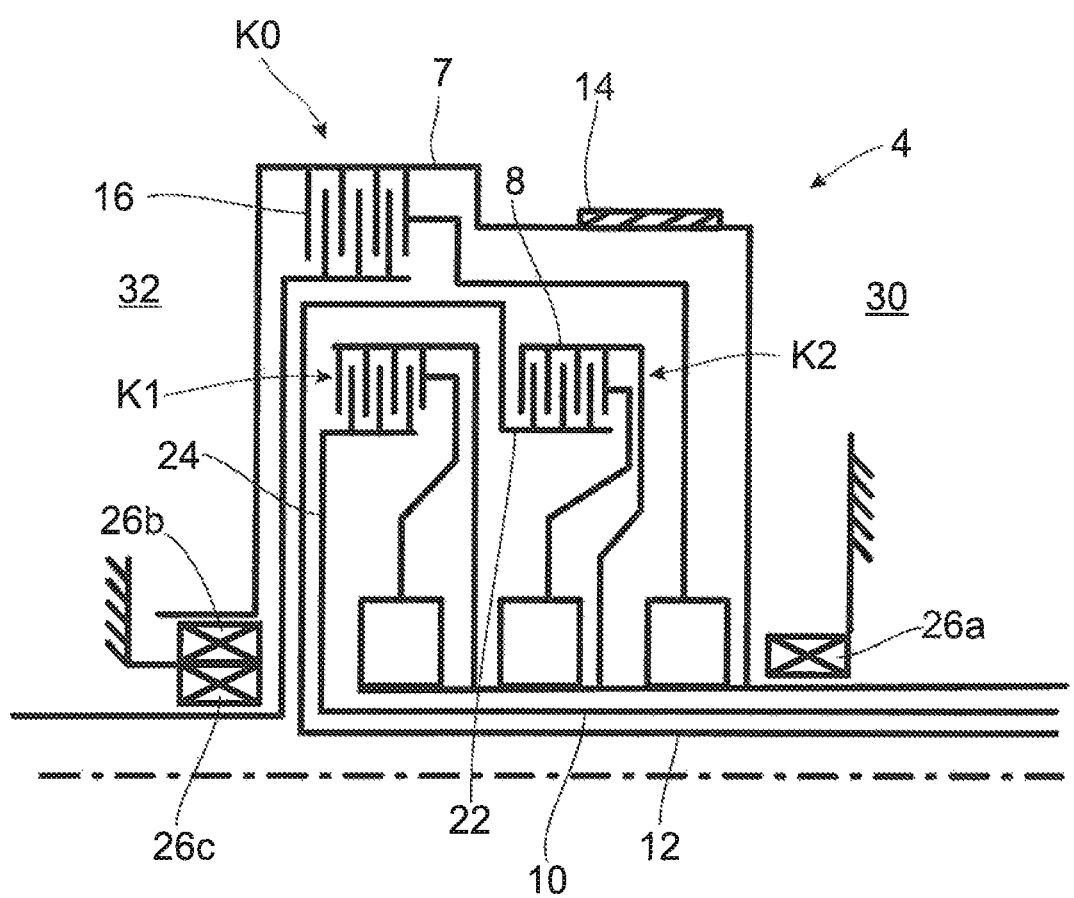
FIG. 5 is a triple clutch arrangement configuration.

FIG. 5 shows a further configuration of clutch arrangement 4 in which clutch K0 is pulled via clutch K1. Accordingly, toothing 14 can be placed closer to transmission input shafts 10 and 12, respectively, and second drive device 6 can also be brought closer to the transmission input shafts overall in this way. Accordingly, clutch K0 and second drive device 6 can at least partially overlap in radial direction. In order to implement this, outer plate carrier 7 of clutch K0 is pot-shaped with a step in the central area. Toothing 14 is arranged in the annular area near the base, while the grooves for receiving outer plates 16 are arranged in the second pot-shaped region.

The modifications over FIG. 2, which were carried out in FIGS. 3 and 4, can also be carried out in the configuration according to FIG. 5. Thus as a variation of the configuration according to FIG. 5, the actuation device of clutch K0 can be mounted on bearing 26a and the bearing support of the outer plate carrier can accordingly be carried out on the motor side 32.

Figure 6:
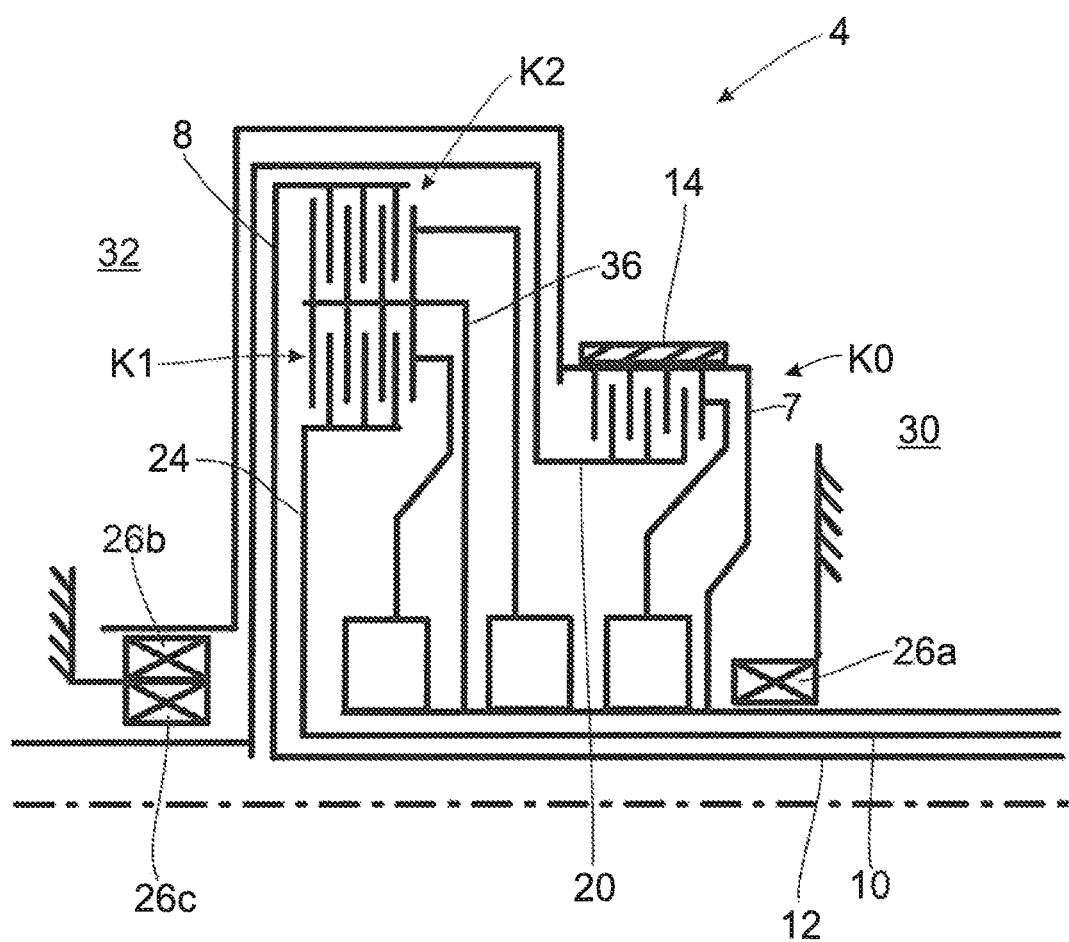
FIG. 6 is a triple clutch arrangement configuration.

FIG. 6 shows a further possible configuration of clutch arrangement 4. In this configuration, clutch K0 is arranged between clutches K1 and K2 and transmission 3. In this configuration, inner plate carrier 22 of clutch K2 and outer plate carrier 9 of clutch K1 are preferably combined to form an individual plate carrier 36. The advantage of this embodiment form consists in that clutches K1 and K2 can be constructed like a known dual clutch arrangement. In contrast to, or as a further development of, known dual clutch arrangements as has also already been shown in FIGS. 2 to 5, inner plate carrier 20 of clutch K0 is part of the housing of the dual clutch arrangement, i.e., of at least one of the clutches K1 or K2. In the configuration shown in FIG. 6, inner plate carrier 20 is part of the housing for both clutches K1 and K2.

Figure 7:
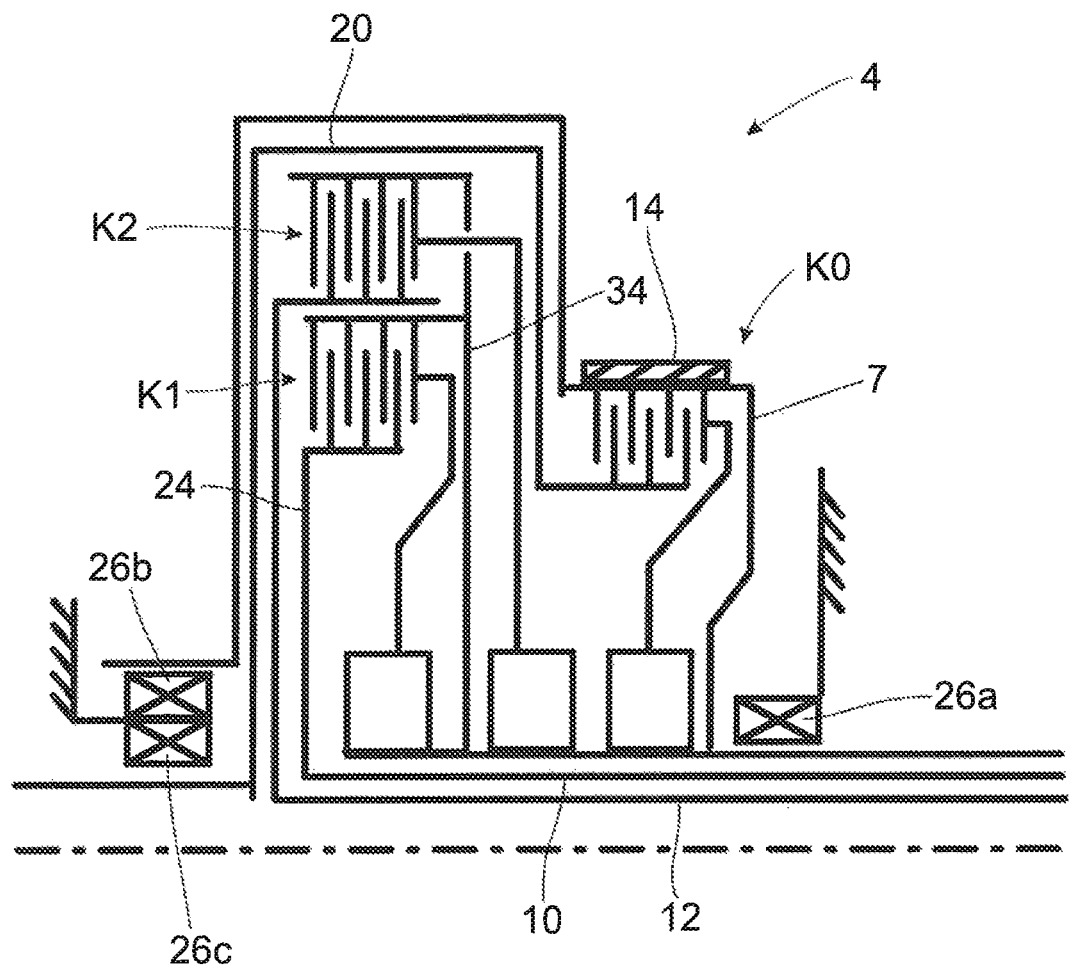
FIG. 7 is a triple clutch arrangement configuration.

FIG. 7 shows a variant of the clutch arrangement 4 according to FIG. 6. In this case, outer plate carriers 8 and 9 of clutches K1 and K2 are combined to form a double outer plate carrier 34. In contrast to the configuration according to FIG. 4, both outer plate carriers of the dual clutch arrangements, i.e., the outer plate carriers of clutches K1 and K2, have a common outer plate carrier portion, while the outer plate carriers of clutches K0 and K2 were combined in the configuration according to FIG. 4.

FIGS. 2 to 7 show an L-shaped arrangement of clutches K0, K1, and K2. An upright L arrangement as is shown in FIGS. 5 to 7 is particularly preferable. As has been described, one of the clutches and the driven shaft of second drive device 6 can overlap in radial direction in this arrangement. A high packing density of structural component parts is achieved in this way.

Figure 8:
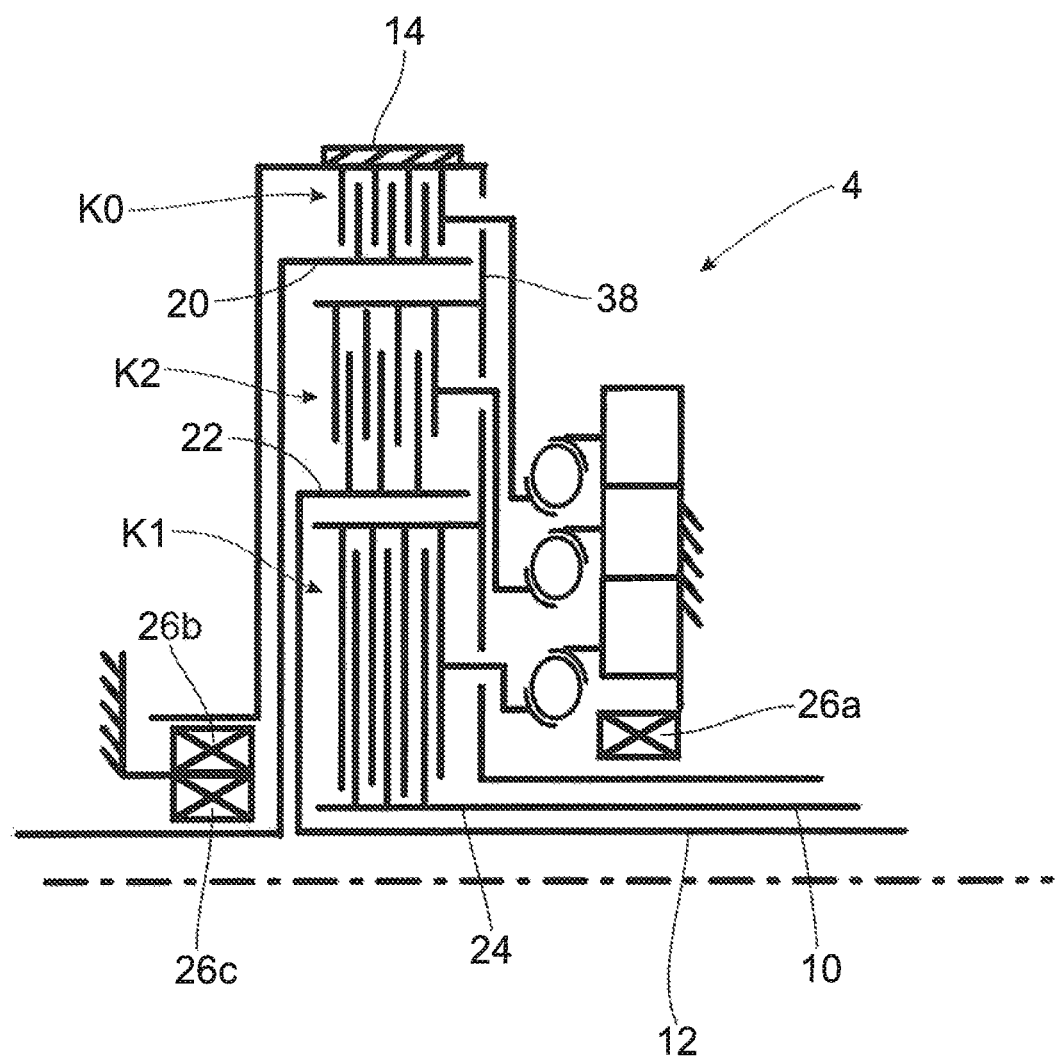
FIG. 8 is a triple clutch arrangement configuration.
Figure 9:
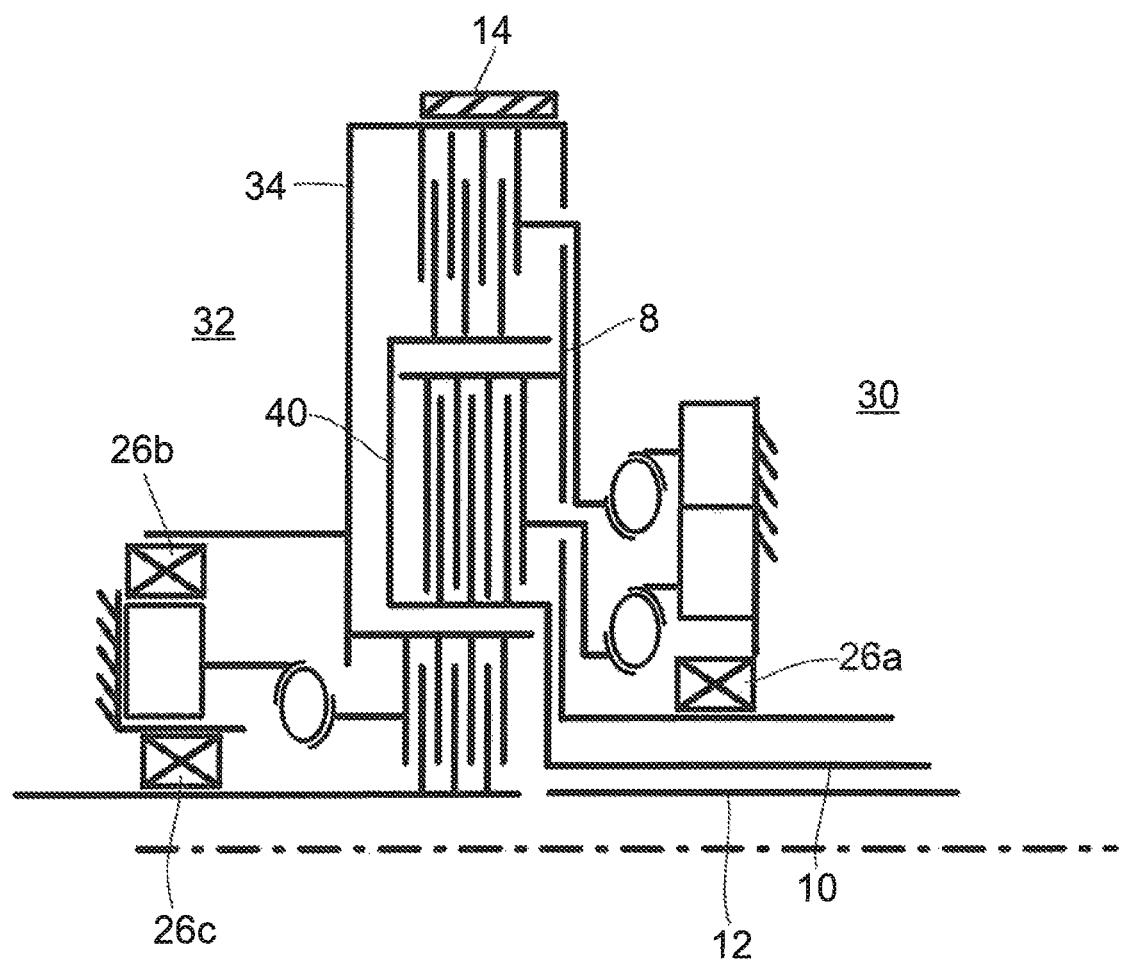
FIG. 9 is a triple clutch arrangement configuration.

In contrast, clutches K0, K1, and K2 are arranged coaxially in the embodiment forms according to FIGS. 8 and 9. By "arrangement of clutches" is meant the arrangement of the plate packs. This also applies to FIGS. 2 to 7.

In the first embodiment form with coaxial arrangement of clutches K0, K1 and K2, clutch K0 is arranged radially outside. In this configuration, outer plate carriers 7, 8, and 9 are combined to form an individual triple outer plate carrier 38. That is, outer plate carriers 7, 8, and 9 have at least part of the radial portion of the wall of outer plate carriers 7, 8, and 9 in common, while the axial portions to which outer plates 16 are fastened so as to be fixed with respect to relative rotation of course remain separate. In other words, portions facing in axial direction, all of which are fixedly connected to one another, proceed from a wall 38 arranged in radial direction. In this way, one individual wall is needed in radial direction.

The further features of clutch arrangement 4 according to FIG. 8 automatically follow from the above remarks and reference numerals. One particular that can be highlighted is that all of the actuation devices of clutches K0, K1 and K2 are supported via bearing 26a.

FIG. 9 shows a further configuration of a coaxial arrangement of clutches K0, K1, and K2. Clutch K0 is arranged on the inside. Inner plate carriers 22 and 24 of clutches K1 and K2 are constructed to form a double inner plate carrier 40.

FIGS. 2 to 9 show basic embodiment forms of a clutch arrangement 4. Specific configurations for some of the embodiment forms which have thus far been depicted merely conceptually will be shown in the following descriptions of FIGS. 10 to 12. However, the specific configurations do not limit the possible embodiment forms overall. These are merely particularly advantageous implementations of the embodiment forms.

Figure 10:
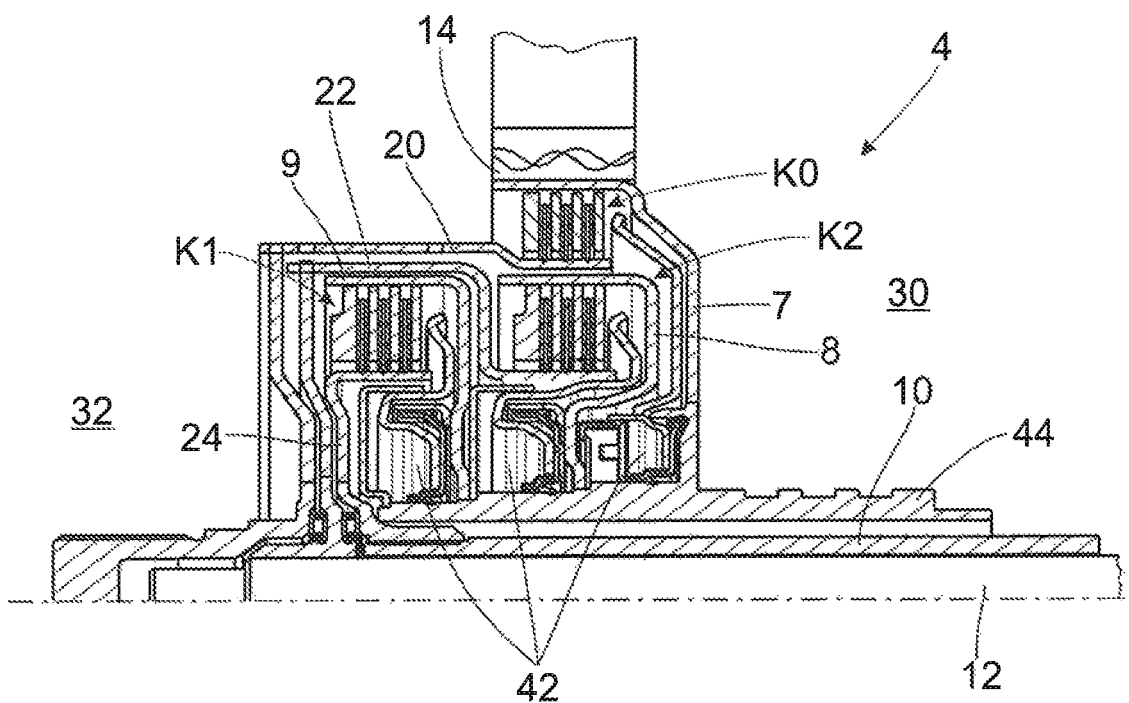
FIG. 10 is a triple clutch arrangement.

FIG. 10 shows a first embodiment form of a clutch arrangement 4. This is an actualization of the configuration from FIG. 3. In particular, inner plate carrier 20 of clutch K0 forms a part of the housing of clutch K1.

In a further development of the foregoing, pressure compensation spaces 42 are provided. In a preferred further development, the latter are arranged adjacent to one another in axial direction. This configuration is possible not only in the configuration according to FIG. 10 but also in all of the depicted embodiment forms in which the one portion of the actuation device is arranged at transmission input shaft 10 as in FIGS. 2, 3, 5, 6, and 7, for example.

Outer plate carriers 7, 8 and 9 of clutches K0, K1 and K2 are connected to one another so as to be fixed with respect to relative rotation via oil supply hub 44. In this configuration, outer plate carriers 8 and 9 are arranged on the primary side, and outer plate carrier 7 of clutch K0 is arranged on the secondary side. In this case, it is also possible to fasten fixedly with respect to relative rotation via component parts other than an oil supply hub 44.

Figure 11:
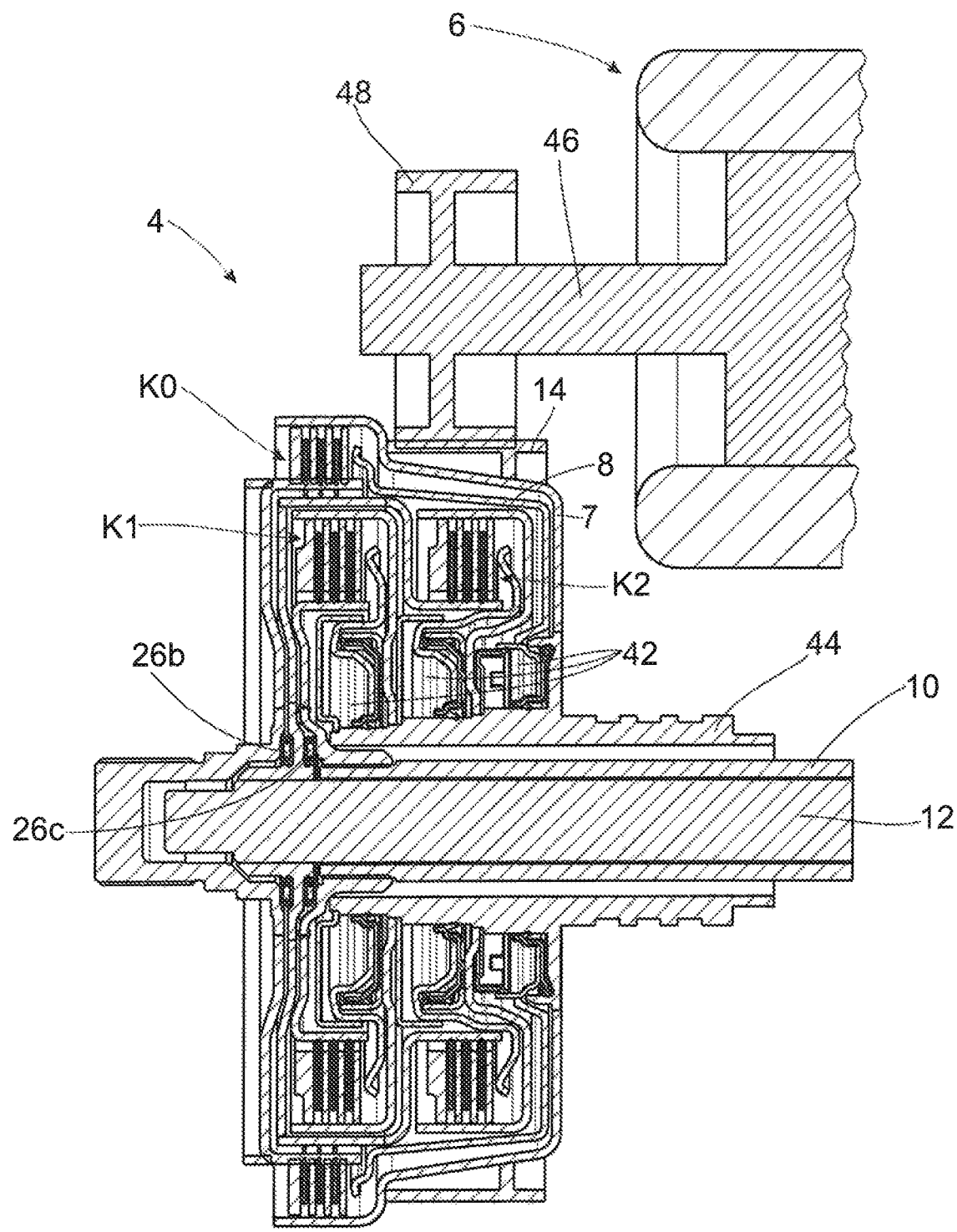
FIG. 11 is a triple clutch arrangement.

FIG. 11 shows an embodiment form of the configuration according to FIG. 5. Clutch K0 is moved over clutch K1 so that the electric motor as second drive unit 6 partially radially overlaps with the plate pack of clutch K0. However, with clutch K2, an axial overlapping takes place so that the entire arrangement in the installation space is efficient. A hub 48 arranged at driven shaft 46 of second drive device 6 engages in toothing 14 of clutch arrangement 4.

For the sake of clarity, the reference numerals that have already been described are omitted, but the significance of the depicted component parts is immediately clear and also follows from the foregoing description.

Figure 12:
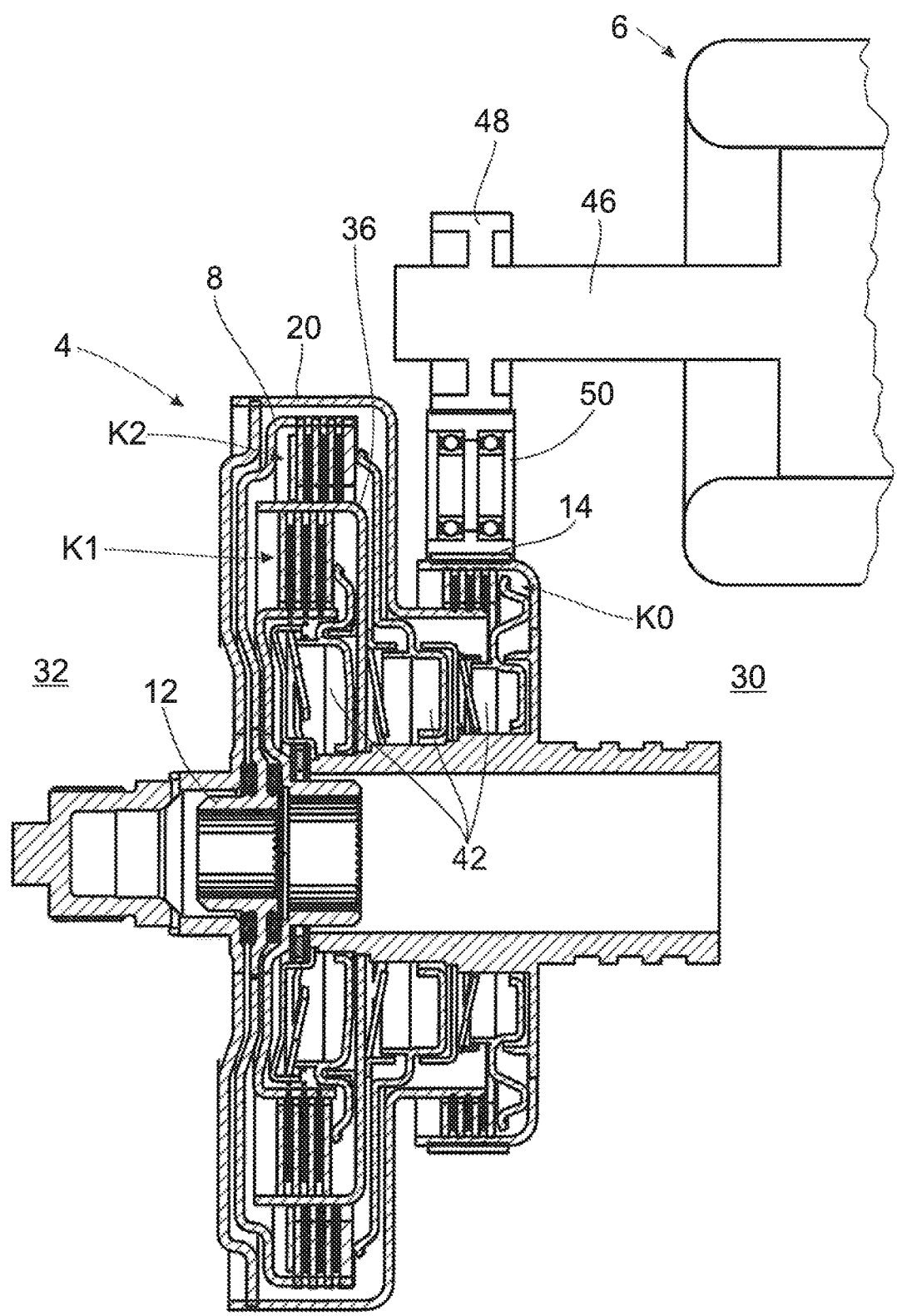
FIG. 12 is a triple clutch arrangement.

FIG. 12 shows a further embodiment form, namely, a configuration analogous to the configuration shown in FIG. 6. As has already been described but not yet graphically depicted, electric motor 6 can be connected to clutch arrangement 4 via an intermediate wheel 50. The arrangement of second drive device 6 can vary extensively compared with clutch device 4. A radial offset can easily be produced in this way. Also in this configuration, inner plate carrier 20 of clutch K0 forms a part of the housing, in this case that of clutches K1 and K2. In this configuration, outer plate carrier 8 of clutch K2 is connected to transmission input shaft 12 so as to be fixed with respect to rotation relative to it and is therefore arranged on the output side or driven side. In contrast, the inner plate carrier of clutch K2 and the outer plate carrier of clutch K1 are configured and arranged as common plate carrier 36. In this configuration, clutch K0 is arranged closer to the transmission on the transmission side 30 than clutches K1 and K2. Surprisingly, this results in a more compact construction than when clutch K0 is arranged on the motor side 32.

The preceding description, particularly FIGS. 6 and 7, can also be referred to in connection with FIG. 12.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A triple clutch arrangement for use between at least two drive devices and a dual clutch transmission, comprising:
   a first clutch of the triple clutch arrangement is configured to be connected to a first drive device of the at least two drive devices and a first transmission input shaft;
   a second clutch of the triple clutch arrangement is connectable to the first drive device and a second transmission input shaft; and
   a third clutch configured to connect the first drive device and a second drive device to a primary side of the first clutch and/or the second clutch,
   wherein an inner plate carrier of the third clutch is formed as part of a housing of at least one of the first clutch and the second clutch,
   wherein the triple clutch arrangement has at an outer side a connection point, configured as a toothing, via which the third clutch is configured to be connected to the second drive device.

2. The triple clutch arrangement according to claim 1, wherein the third clutch is configured to be connected to the second drive device on the secondary side of the third clutch.

3. The triple clutch arrangement according to claim 1, wherein the third clutch is fixedly connected to at least one of the first clutch and the second clutch on a secondary side of the third clutch.

4. The triple clutch arrangement according to claim 3, wherein the third clutch is fixedly connected to the first clutch and the second clutch on the secondary side of the third clutch.

5. The triple clutch arrangement according to claim 1, wherein the secondary side of the third clutch is fixedly connected to at least one of a respective primary side of the first clutch and the second clutch.

6. The triple clutch arrangement according to claim 1, wherein the first, second, and third clutches are arranged in a substantially L-shaped manner.

7. The triple clutch arrangement according to claim 1, wherein the first, second, and third clutches are arranged substantially coaxially.

8. The triple clutch arrangement according to claim 1, wherein the third clutch lies closer to the dual clutch transmission than at least one of the first clutch and the second clutch.

9. The triple clutch arrangement according to claim 1, wherein the triple clutch arrangement is formed as assembly unit.

10. The triple clutch arrangement according to claim 1, wherein the triple clutch arrangement is supported at each side by at least one bearing.

11. The triple clutch arrangement according to claim 1, wherein an inner plate carrier of the third clutch is formed as part of a housing of the first clutch and the second clutch.

12. The triple clutch arrangement according claim 1, wherein the third clutch is a multiplate clutch, and an outer plate carrier of the third clutch is arranged on the secondary side.

13. The triple clutch arrangement according to claim 1, wherein the connection point is arranged at the secondary side, which is an outer plate carrier, of the third clutch.

14. The triple clutch arrangement according to claim 1, wherein the first clutch and the second clutch are constructed as a dual clutch.

15. A powertrain for a motor vehicle comprising:
a first drive device;
a second drive device;
a transmission; and
a triple clutch arrangement, comprising:
a first clutch of the triple clutch arrangement is configured to be connected to the first drive device and a first transmission input shaft;
a second clutch of the triple clutch arrangement is connectable to the first drive device and a second transmission input shaft; and
a third clutch configured to connect the first drive device and the second drive device to a primary side of the first clutch and/or the second clutch,
wherein an inner plate carrier of the third clutch is formed as part of a housing of at least one of the first clutch and the second clutch,
wherein the triple clutch arrangement has at an outer side a connection point, configured as a toothing, via which the third clutch is configured to be connected to the second drive device.

16. The powertrain according to claim 15, wherein the second drive device is a paraxial electric motor.

17. A motor vehicle comprising:
a first drive device;
a second drive device;
a transmission; and
a triple clutch arrangement, comprising:
a first clutch of the triple clutch arrangement is configured to be connected to the first drive device and a first transmission input shaft;
a second clutch of the triple clutch arrangement is connectable to the first drive device and a second transmission input shaft; and
a third clutch configured to connect the first drive device and a second drive device to a primary side of the first clutch and/or the second clutch,
wherein an inner plate carrier of the third clutch is formed as part of a housing of at least one of the first clutch and the second clutch,
wherein at least one of:
the triple clutch arrangement has at an outer side a connection point, configured as a toothing, via which the third clutch is configured to be connected to the second drive device, and
the second drive device is a paraxial electric motor.

* * * * *